(12) United States Patent
Rowe

(10) Patent No.: US 7,159,629 B1
(45) Date of Patent: Jan. 9, 2007

(54) WORKTABLE APPARATUS

(76) Inventor: Braxton E. Rowe, 1922 Rosedale St. North East, Washington, DC (US) 20002

( * ) Notice: Subject to any disclaimer, the term of this patent is extended or adjusted under 35 U.S.C. 154(b) by 0 days.

(21) Appl. No.: 11/186,244

(22) Filed: Jul. 22, 2005

(51) Int. Cl.
*B25H 1/12* (2006.01)
(52) U.S. Cl. ............... 144/285; 144/286.1; 144/286.5; 83/477.2; 269/16; 312/237
(58) Field of Classification Search ............... 144/285, 144/287, 286.1, 286.5, 253.1, 253.2, 1.1, 144/134.1; 83/477.2; 269/16; 312/223.6, 312/237
See application file for complete search history.

(56) References Cited

U.S. PATENT DOCUMENTS

| | | | | | |
|---|---|---|---|---|---|
| 9,544 | A | * | 1/1853 | Cook | ............... 83/477.2 |
| 3,570,565 | A | * | 3/1971 | Morgan | ............... 144/1.1 |
| 3,734,151 | A | * | 5/1973 | Skripsky | ............... 144/286.5 |
| 4,335,765 | A | * | 6/1982 | Murphy | ............... 144/286.1 |
| 4,483,573 | A | * | 11/1984 | Keller | ............... 312/281 |
| 4,503,739 | A | * | 3/1985 | Konieczka | ............... 83/471.1 |
| 4,516,612 | A | * | 5/1985 | Wiley | ............... 144/1.1 |
| 4,733,704 | A | * | 3/1988 | Wolff | ............... 144/286.1 |
| 4,887,653 | A | * | 12/1989 | Thomas | ............... 144/286.1 |
| 5,161,590 | A | | 11/1992 | Otto | |
| D346,709 | S | | 5/1994 | Nagao | |
| 5,431,206 | A | * | 7/1995 | McAllister | ............... 144/286.1 |
| 5,518,053 | A | | 5/1996 | Robison | |
| 5,722,473 | A | | 3/1998 | Tucker | |
| 6,520,227 | B1 | * | 2/2003 | Mc Farlin et al. | ............... 144/371 |
| 6,565,165 | B1 | | 5/2003 | Switkes | |
| 6,857,456 | B1 | * | 2/2005 | Manning | ............... 144/286.5 |

* cited by examiner

Primary Examiner—Bena Miller (57) ABSTRACT

A worktable apparatus includes a table with a tabletop having a plurality of legs attached thereto. The tabletop has an opening extending therethrough. A panel is hingedly coupled to the tabletop adjacent to the opening and is selectively positionable in a closed position extending over the opening or in an open position exposing the opening. The panel has an upper surface and a lower surface. The panel has central aperture extending therethrough. A plurality of brackets is attached to the lower surface of the panel. The brackets are configured to releasably couple a cutting tool to the lower surface and so that a cutting implement of the cutting tool extends through the central aperture.

13 Claims, 13 Drawing Sheets

WORKTABLE APPARATUS

BACKGROUND OF THE INVENTION

1. Field of the Invention

The present invention relates to worktable devices and more particularly pertains to a new worktable device for selectively holding one of a plurality of cutting tools and for turning table into a cutting table. The invention also relates to workbenches and the like configured for holding a plurality of tools and for supporting a portion of wood being cut and shaped.

2. Description of the Prior Art

The use of worktable devices is known in the prior art. U.S. Pat. No. 15,431,206 describes a portable workstation configured for supporting a power cutting tool. Another type of worktable device is U.S. Pat. No. 5,518,053 which again includes a portable table assembly that is configured for holding a power cutting tool. Still yet another such worktable is found in U.S. Pat. No. 5,722,473 that includes a table adapted for supporting a power tool.

While these devices fulfill their respective, particular objectives and requirements, the need remains for a worktable device which is configured for holding one of a plurality of power tools, and in particular those power tools used for cutting. The device extends a cutting implement of the tool being used upwardly so that the device functions as a cutting table. The device should include a relatively easy method of removing one cutting tool and replacing it with another. Also, the device should include a plurality of fittings and openings for receiving variously sized cutting implements.

SUMMARY OF THE INVENTION

The present invention meets the needs presented above by generally comprising a table that includes a tabletop has a top side, a bottom side, a front edge, a back edge, a first side edge and a second side edge. A plurality of legs is attached to the bottom side and extends downwardly therefrom. The tabletop has an opening extending therethrough that extends between the front and back edges and is positioned between the first and second side edges. A panel is hingedly coupled to the tabletop adjacent to the opening and is selectively positionable in a closed position extending over the opening or in an open position exposing the opening. The panel has an upper surface and a lower surface. The panel has central aperture extending therethrough. A plurality of brackets is attached to the lower surface of the panel. The brackets are configured to releasably couple a cutting tool to the lower surface so that a cutting implement of the cutting tool extends through the central aperture.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 16 thereof, a new worktable device embodying the principles and concepts of the present invention and generally designated by the reference numeral 10 will be described.

As best illustrated in FIGS. 1 through 16, the worktable apparatus 10 generally comprises a table 12 that includes a tabletop 13 having a top side 14, a bottom side 15, a front edge 16, a back edge 17, a first side edge 18 and a second side edge 19. A plurality of legs 20 is attached to the bottom side 15 and extends downwardly therefrom. The tabletop 13 has an opening 21 extending therethrough. The opening 21 generally extends between the front 16 and back 17 edges and is positioned between the first 18 and second 19 side edges.

A panel 24 is hingedly coupled to the tabletop 13 adjacent to the opening 21. The panel 24 is selectively positioned in a closed position extending over the opening 21 or in an open position exposing the opening 21. The panel 24 has an upper surface 25 and a lower surface 26. The panel 24 has central aperture 27 extending therethrough that is circular in shape and has a diameter of between ½ inch and 2 inches. The panel 24 has an elongated aperture 28 therein. The elongated aperture 27 has a length greater than 5 inches. The elongated aperture 28 is orientated parallel to the back edge 17 of the tabletop 13 and is positioned between the central aperture 27 and the back edge 17 of the tabletop 13 when the panel 24 is in the closed position. The panel 24 has an oblong aperture 29 therein. The oblong aperture 29 is positioned between the central aperture 26 and the front edge 16 when the panel 24 is in the closed position. The tabletop 13 and panel 24 are each preferably made from or covered with a metallic material to promote easy movement of a portion of wood positioned thereon.

A plurality of brackets 30 is attached to the lower surface 26 of the panel 24. The brackets 30 are configured to releasably couple a cutting tool 7 to the lower surface 26 and extend a cutting implement of the cutting tool 7 through one of the central aperture 27, the elongated aperture 28 or the oblong aperture 29. The cutting tools 7 preferably include a router, a circular saw and jigsaw. A cutting implement of a router is extendable through the central aperture 27. A cutting implement of a circular saw is extendable through the elongated aperture 28. A cutting implement of a jigsaw is extendable through the oblong aperture 29.

A plurality of guide tracks 32 is positioned in the upper surface 25 of the panel 24. The guide tracks 32 preferably include troughs which extend along an outer edge of the panel 24. A plurality of cutting guides 33 is provided. Each of the cutting guides 33 is selectively mounted in and movable along one of the guide tracks 32. The cutting guides 33 are generally conventional and may include a one or more straight edged fences as well as a blade guard 34 for a miter blade.

A tool drawer 36 is attached to the bottom side 15 of the tabletop 13. A plate 37 is removably mounted in the drawer 36 between an upper edge of the tool drawer 36 and a bottom wall of the tool drawer 36. The plate has a plurality of holes 38 extending therethrough. The plate rests on flanges 41 mounted within the tool drawer 36. Tools 8 may be held in the holes 38 and larger tools 9 may be stored beneath the plate 37. A light 39 is preferably mounted in the tool drawer 36 and includes a pressure-actuated switch 40 that is mounted on the table 12 and which is depressed when the tool drawer 36 is in a closed position. The light 39 is turned off when the switch 40 is depressed and turned on when the switch 40 is released.

A blade drawer 44 is attached to the bottom side 15 of the tabletop 13. The blade drawer 44 includes an upper wall 45 that has a plurality of elongated slots 46 extending therethrough. The slots 46 are configured for receiving circular saw blades 6. A light 47 may also be mounted in the blade drawer 44 and includes a pressure-actuated switch 48 that is mounted on the table 12 and which is depressed when the balder drawer 44 is in a closed position. The light 47 is turned off when the switch 48 is depressed and turned on when the switch 48 is released.

A housing 50 is mounted to the table 12 and spaced from the tabletop 13. The housing 50 has a cover 51 attached thereto for selectively opening or closing the housing 50. The housing 50 is preferably mounted on supports 22 attached to and extending between the legs 21. The housing 50 may be used for holding power cutting tools.

A power outlet 52 is mounted on the table 12. An electrical power cord 53 is electrically coupled to the power outlet 52. A cut-off switch 54 is electrically coupled to the power outlet 52 and is configured to selectively close an electrical connection between the power outlet 52 and the power cord 53. The cut-off switch 54 is positioned on a front side of the table 12. The power outlet 52 may be used for powering any power cutting tools attached to the panel 12. The cut-off switch 54 provides a convenient way to turn the cutting tools on or off, as their individual power switches will be located below the panel 12 and difficult to reach when held with the brackets 30. A power indicator light 55 is preferably electrically coupled to the power outlet 52 for indicating when power is being supplied to the power outlet 52. The power outlet 52 includes a power switch 56. A lamp 57 may also be mounted to the table 12 and electrically coupled to the power outlet 52.

A biasing assembly 60 is attached to the table 12 and biases the panel 24 upwardly when the panel 24 is placed in the open position. The biasing assembly 60 includes one or more pneumatic pistons that fill with air when extended to retain the panel 24 in the lifted position while a person changes or mounts the cutting tool 7.

Figure 1:
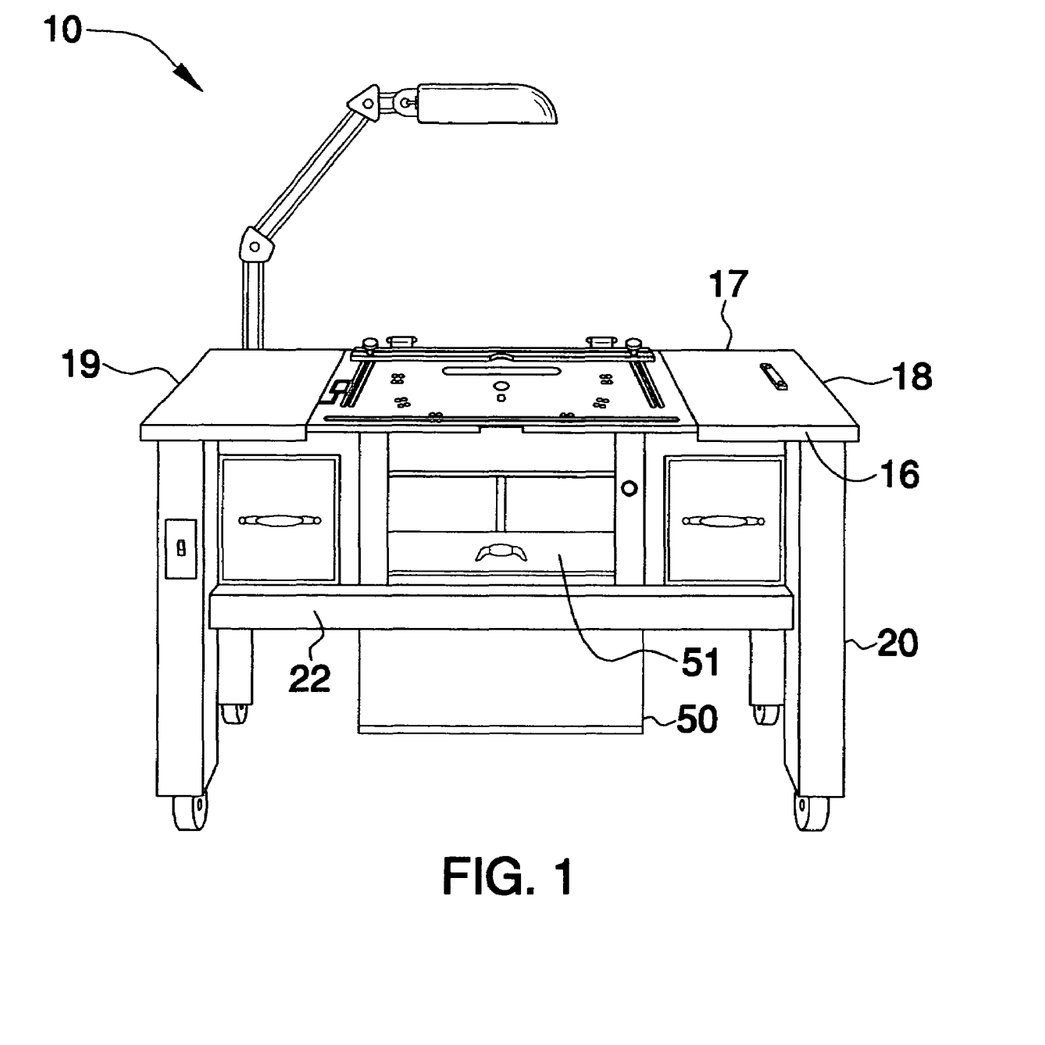
FIG. 1 is a front perspective view of a worktable apparatus according to the present invention.
Figure 2:
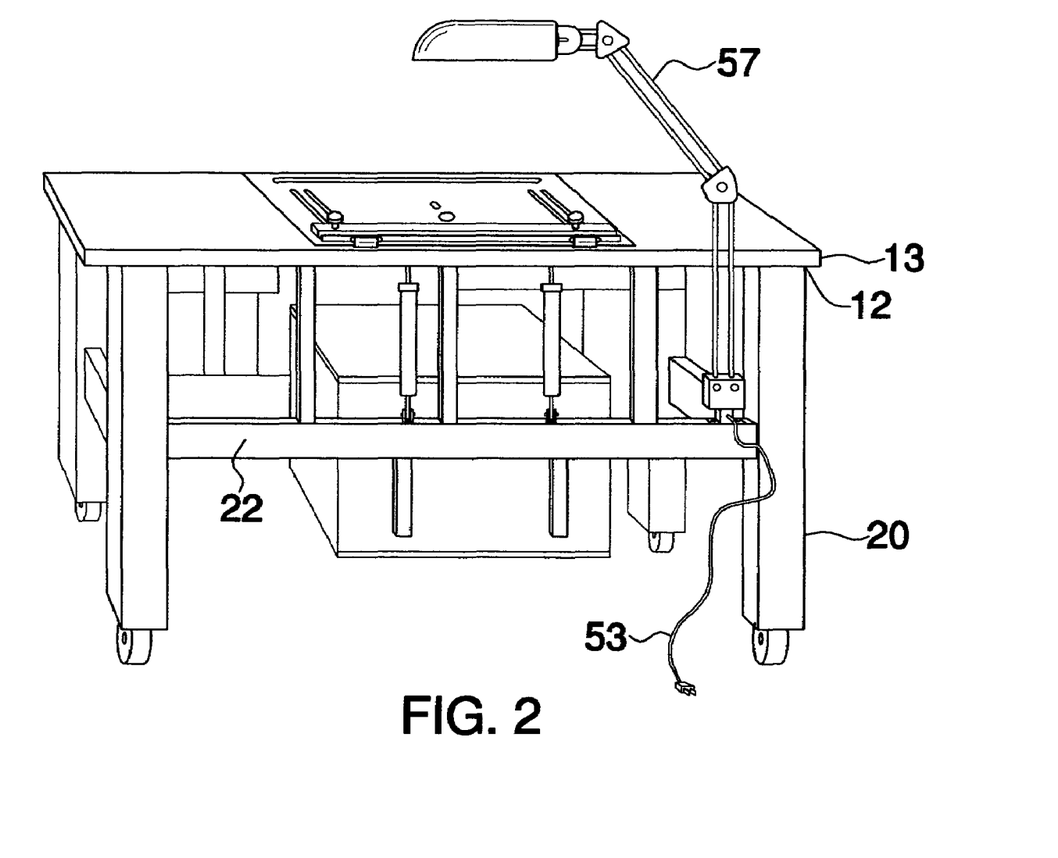
FIG. 2 is a rear perspective view of the present invention.
Figure 3:
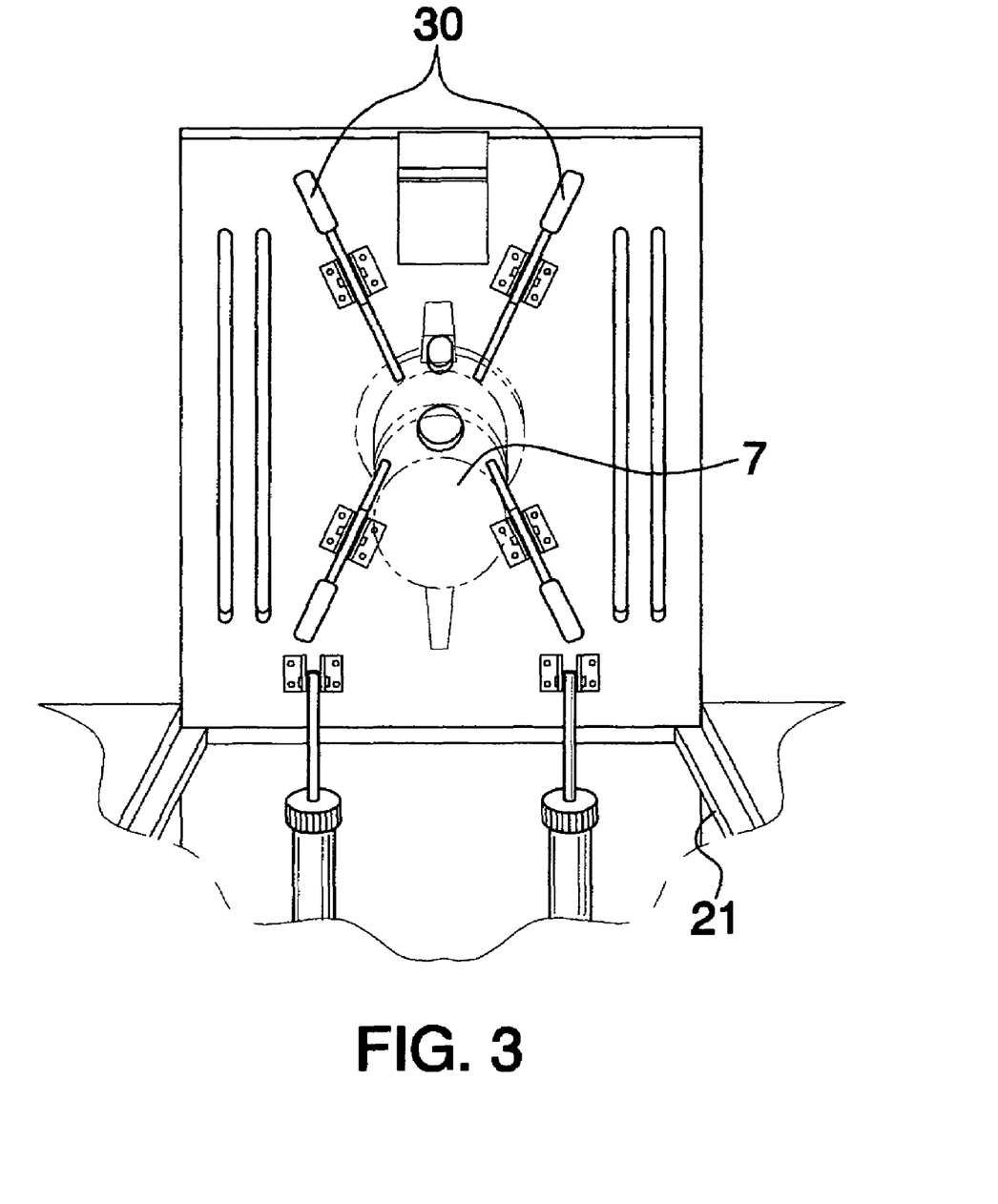
FIG. 3 is a bottom view of a panel of the present invention.
Figure 4:
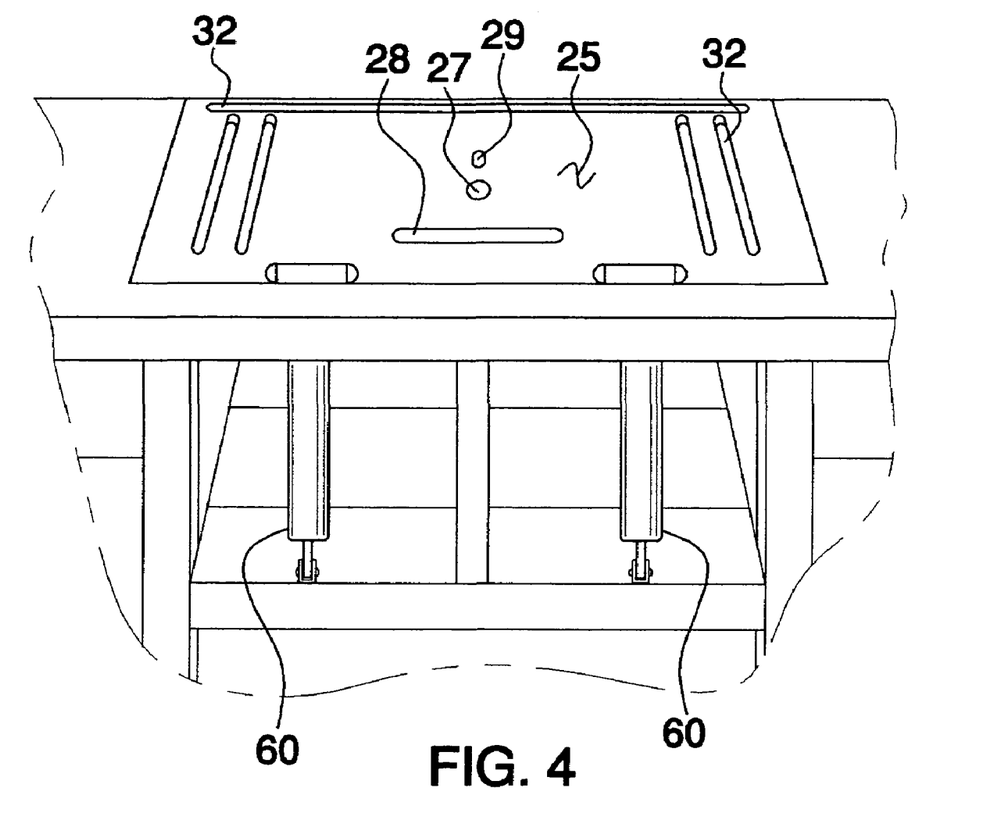
FIG. 4 is a top perspective view of the panel of the present invention.
Figure 5:
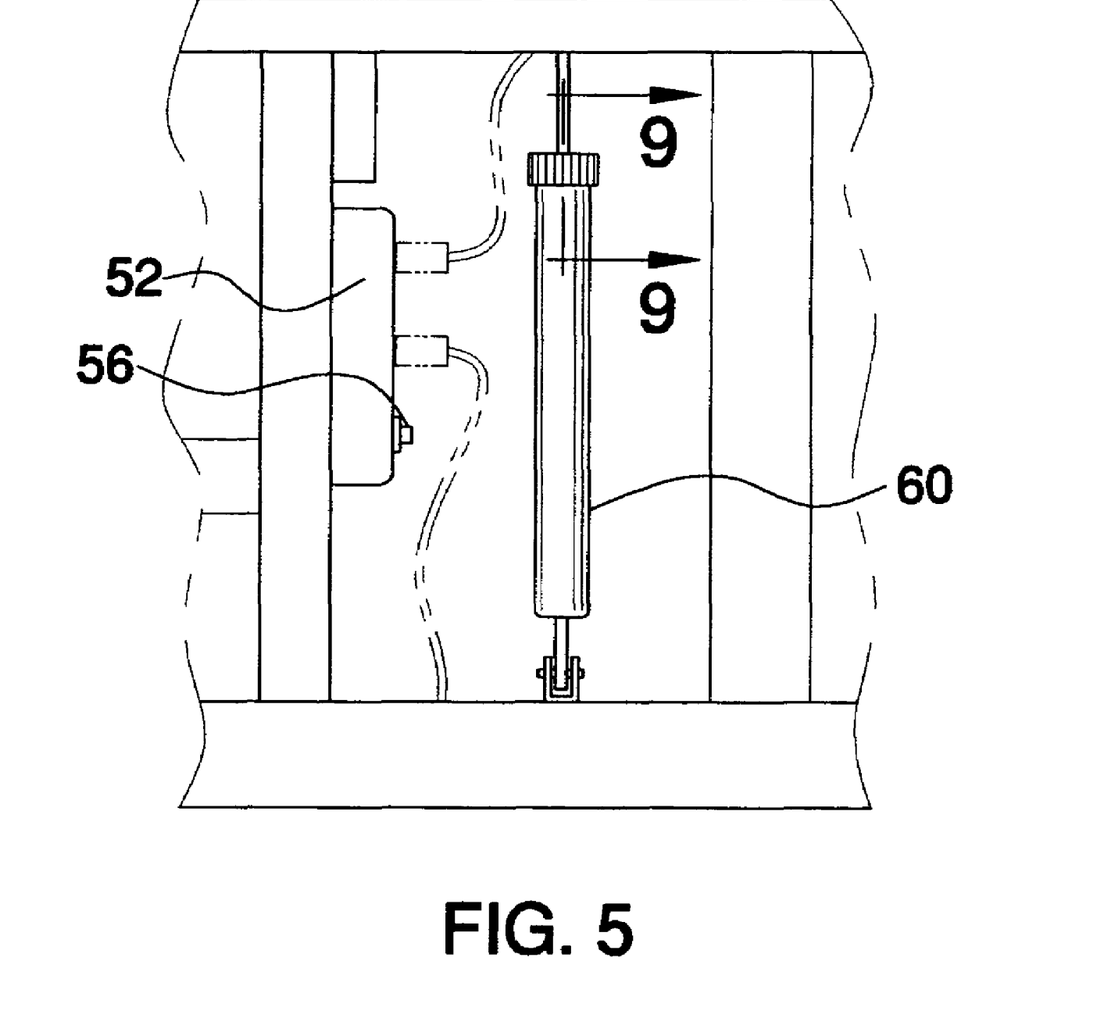
FIG. 5 is a side view of a biasing member of the present invention.
Figure 6:
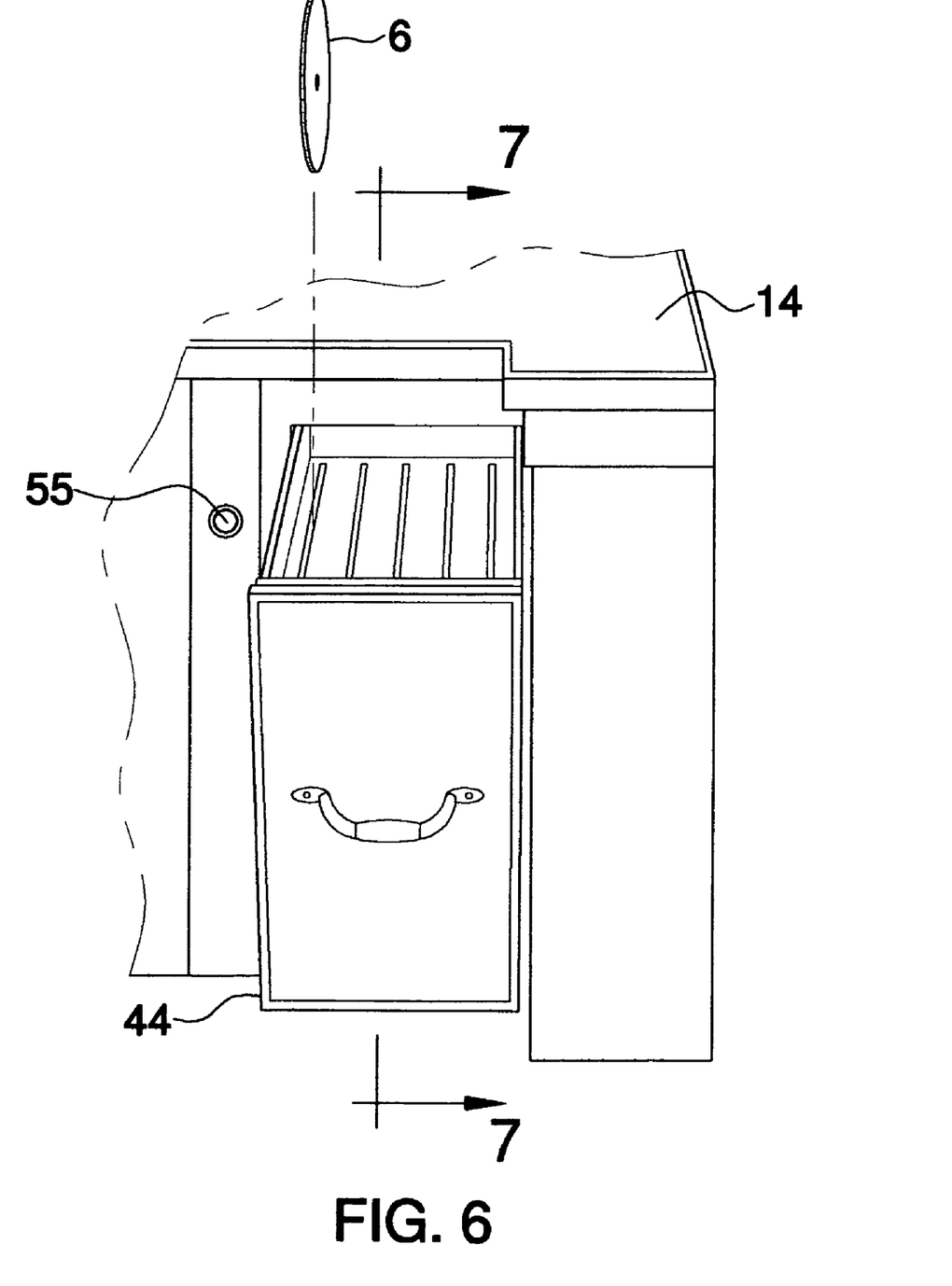
FIG. 6 is a front perspective view of a blade drawer of the present invention.
Figure 7:
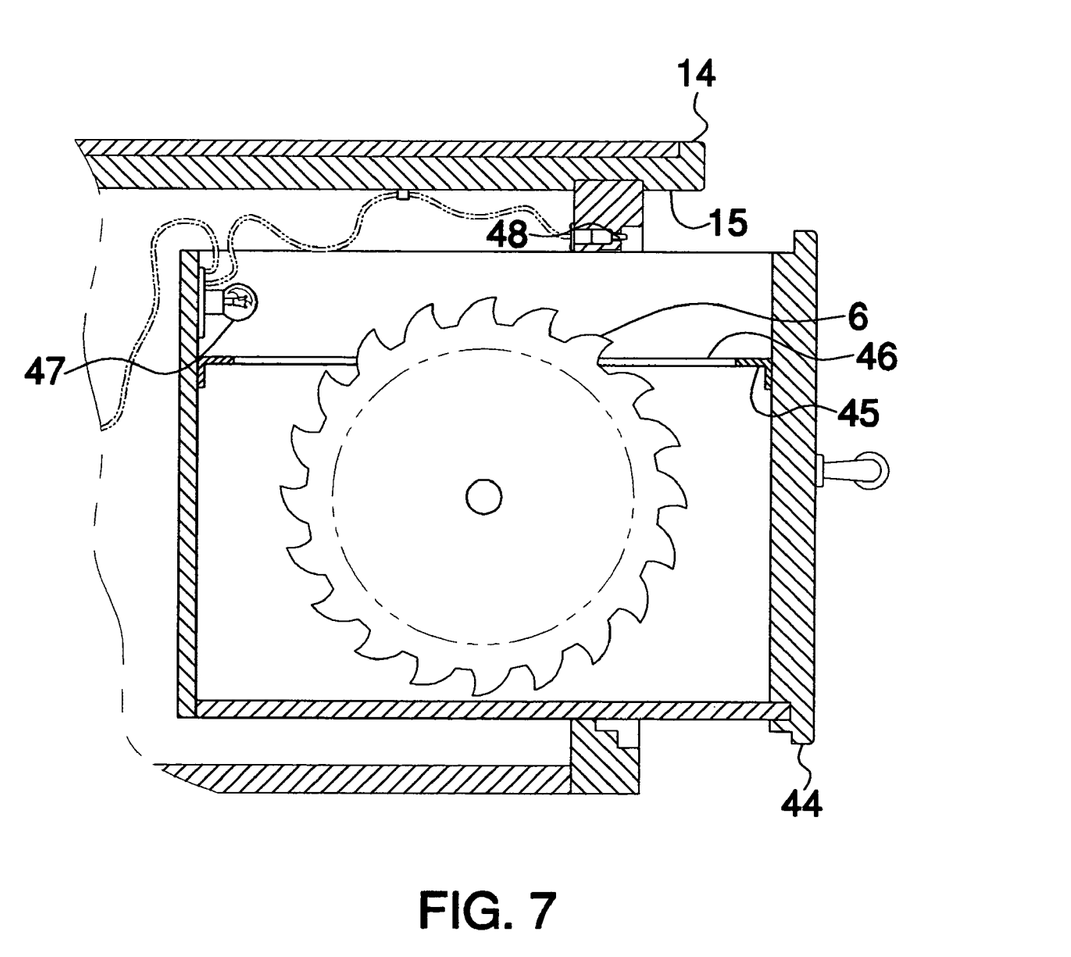
FIG. 7 is a cross-sectional view taken along line 7—7 of FIG. 6 of the present invention.
Figure 8:
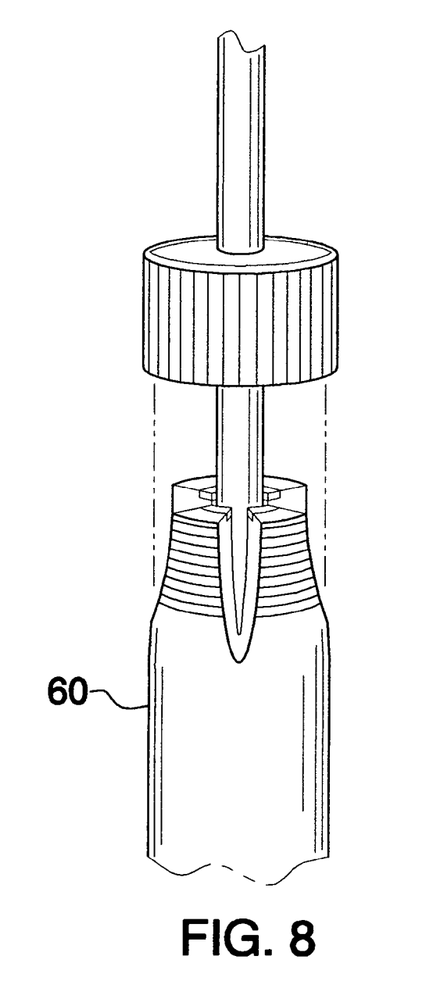
FIG. 8 is a perspective view of the biasing member of the present invention.
Figure 9:
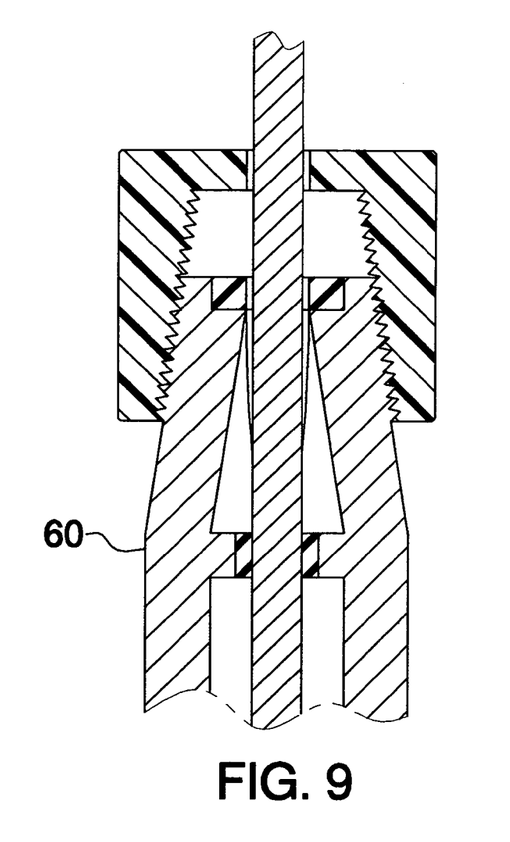
FIG. 9 is a cross-sectional view taken along line 9—9 of FIG. 5 of the present invention.
Figure 10:
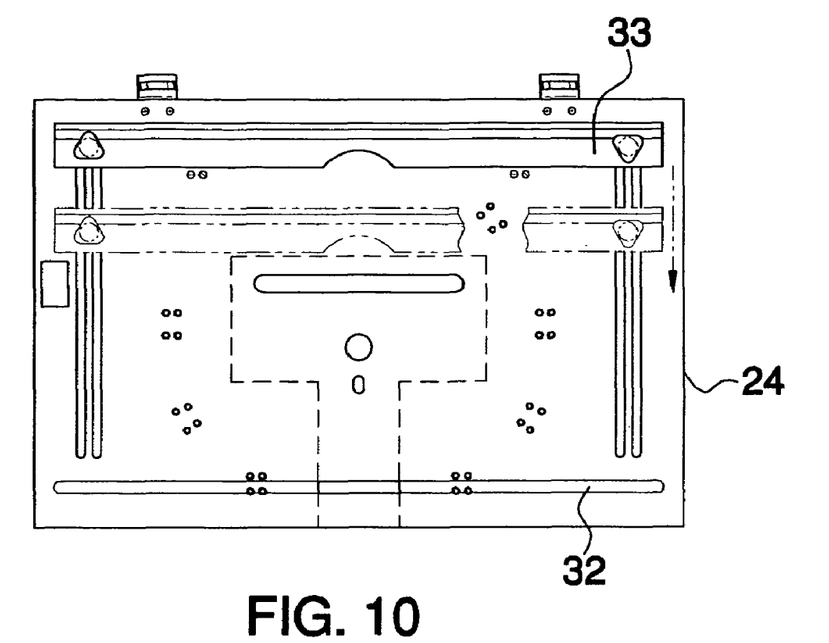
FIG. 10 is a top view of the panel of the present invention.
Figure 11:
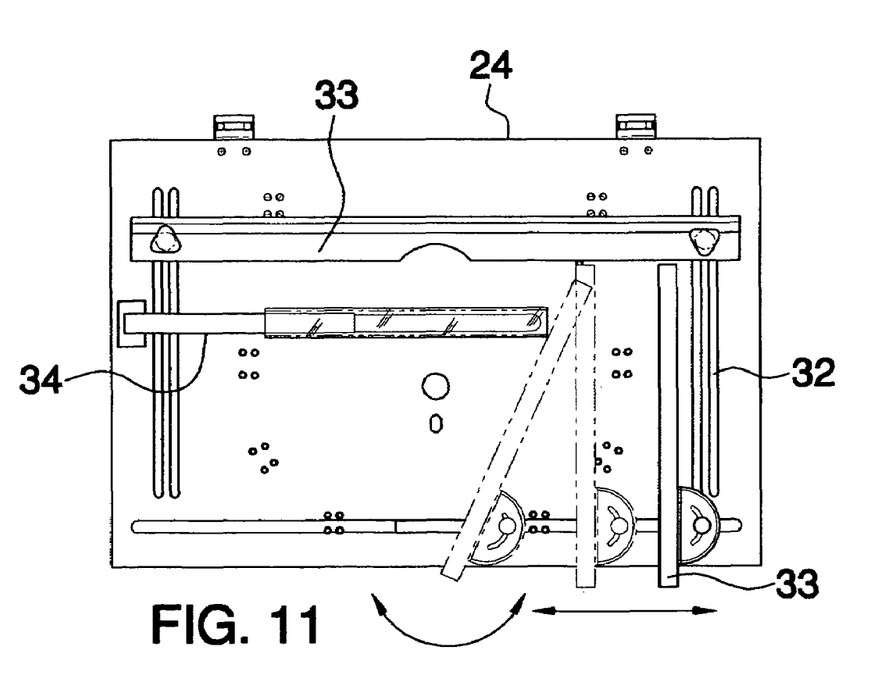
FIG. 11 is a top view of the present invention.
Figure 12:
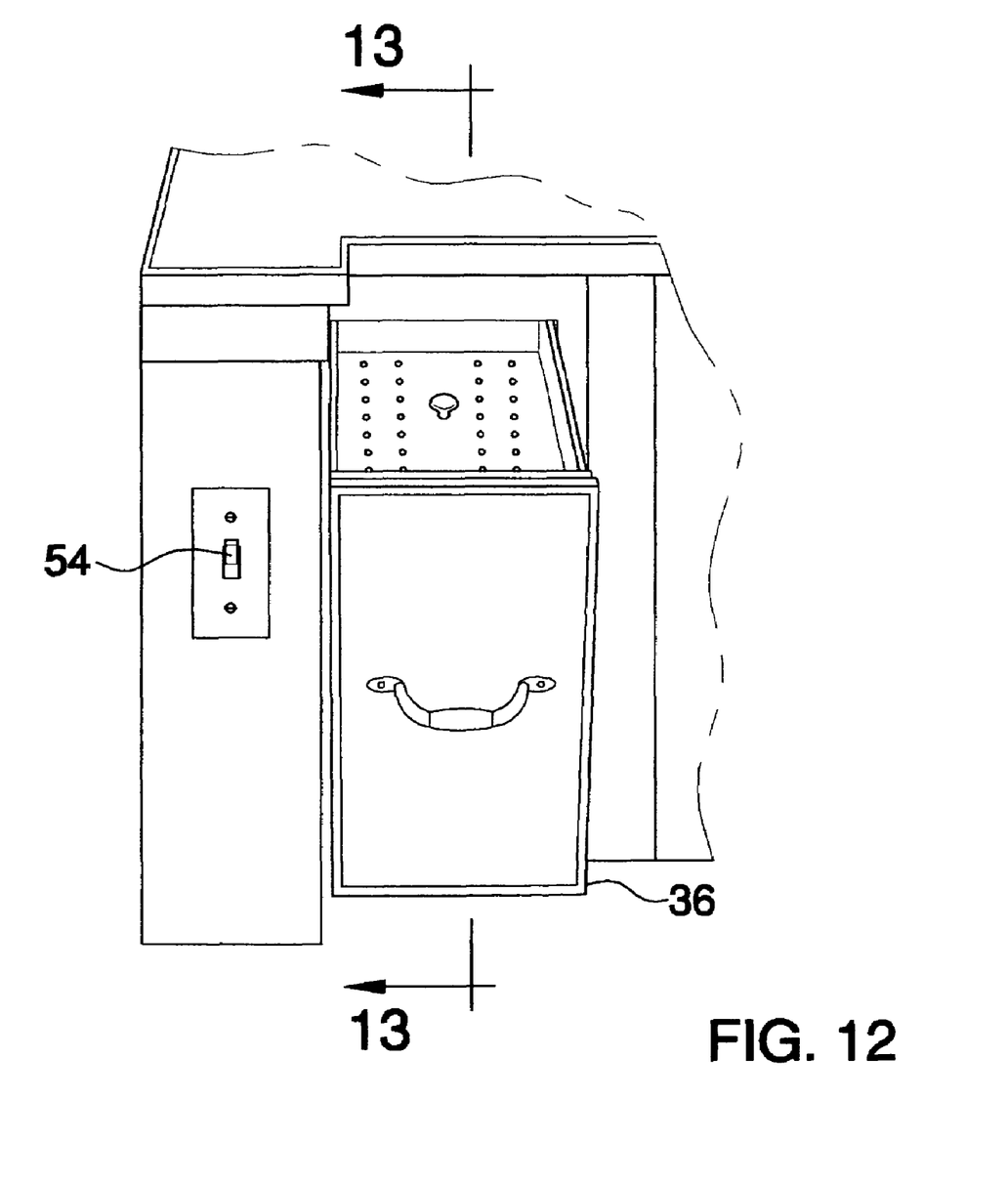
FIG. 12 is a perspective view a tool drawer of the present invention.
Figure 13:
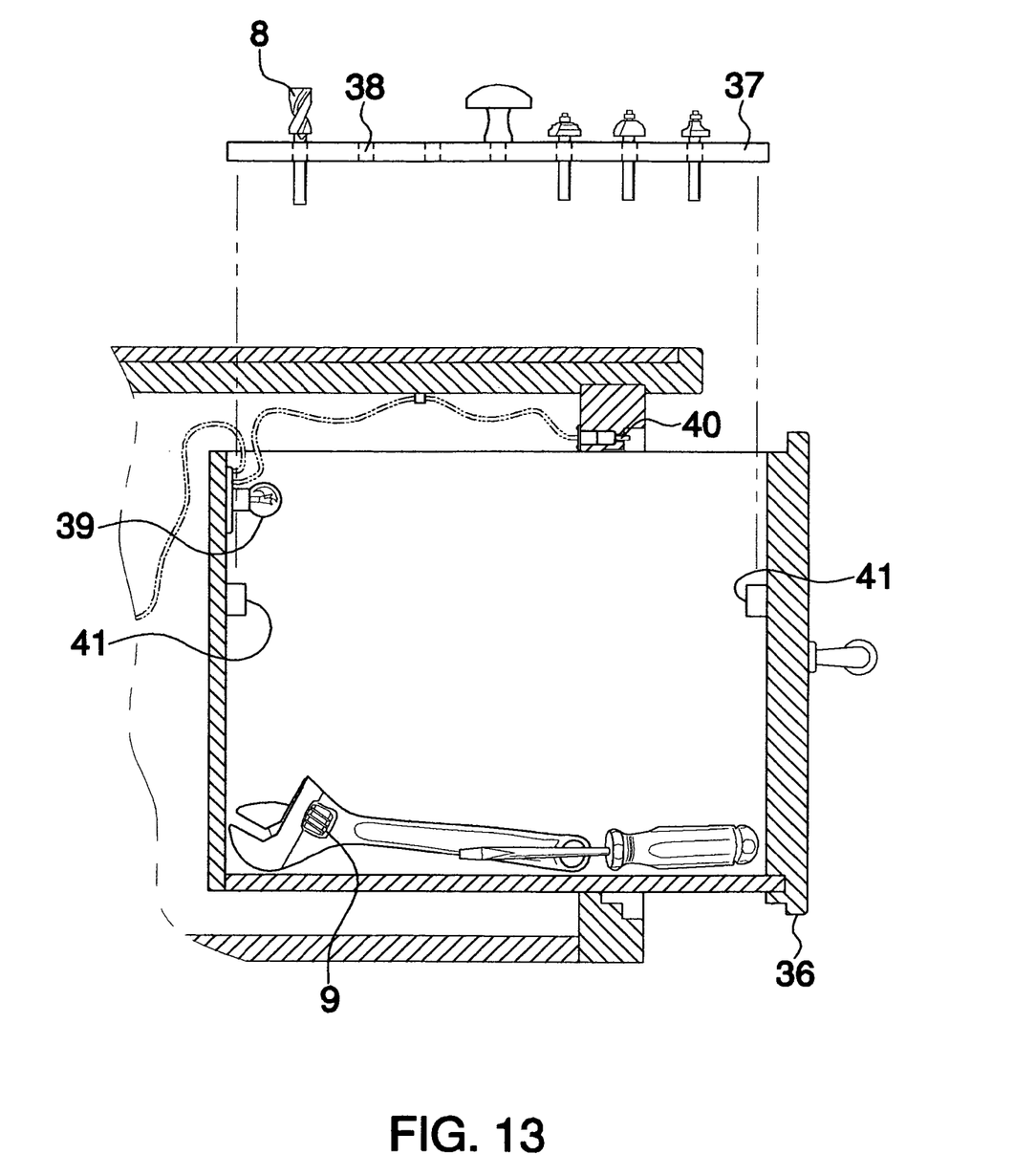
FIG. 13 is a cross-sectional view taken along line 13—13 of FIG. 12 of the present invention.
Figure 14:
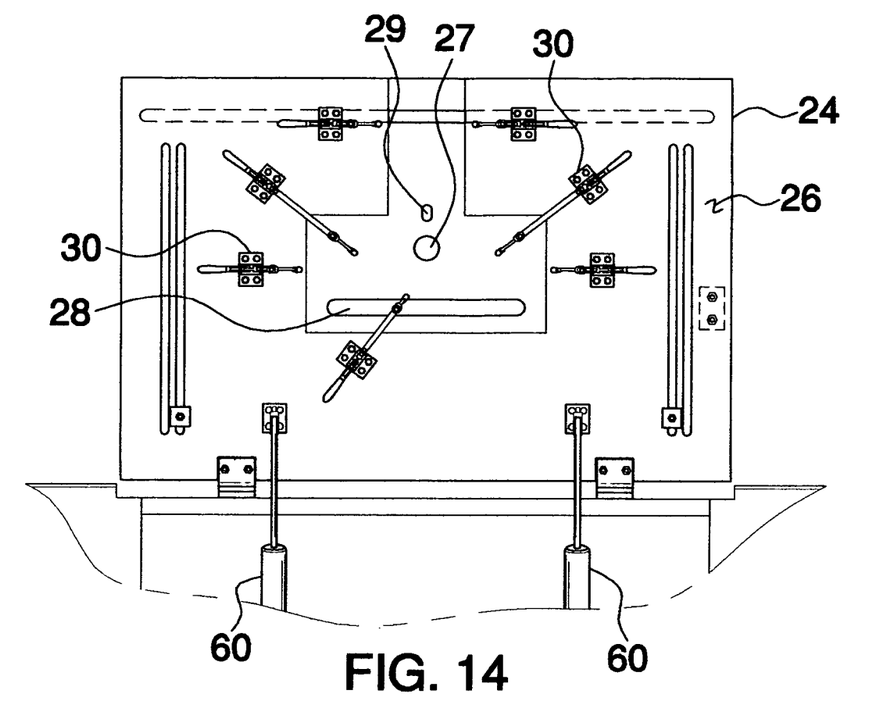
FIG. 14 is a bottom view of the panel of the present invention.
Figure 15:
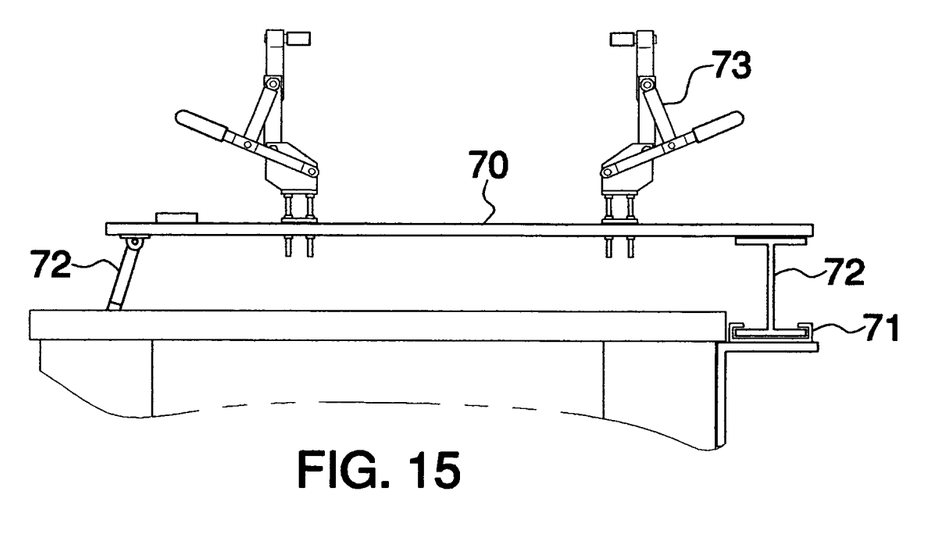
FIG. 15 is a side view of a table attachment of the present invention.
Figure 16:
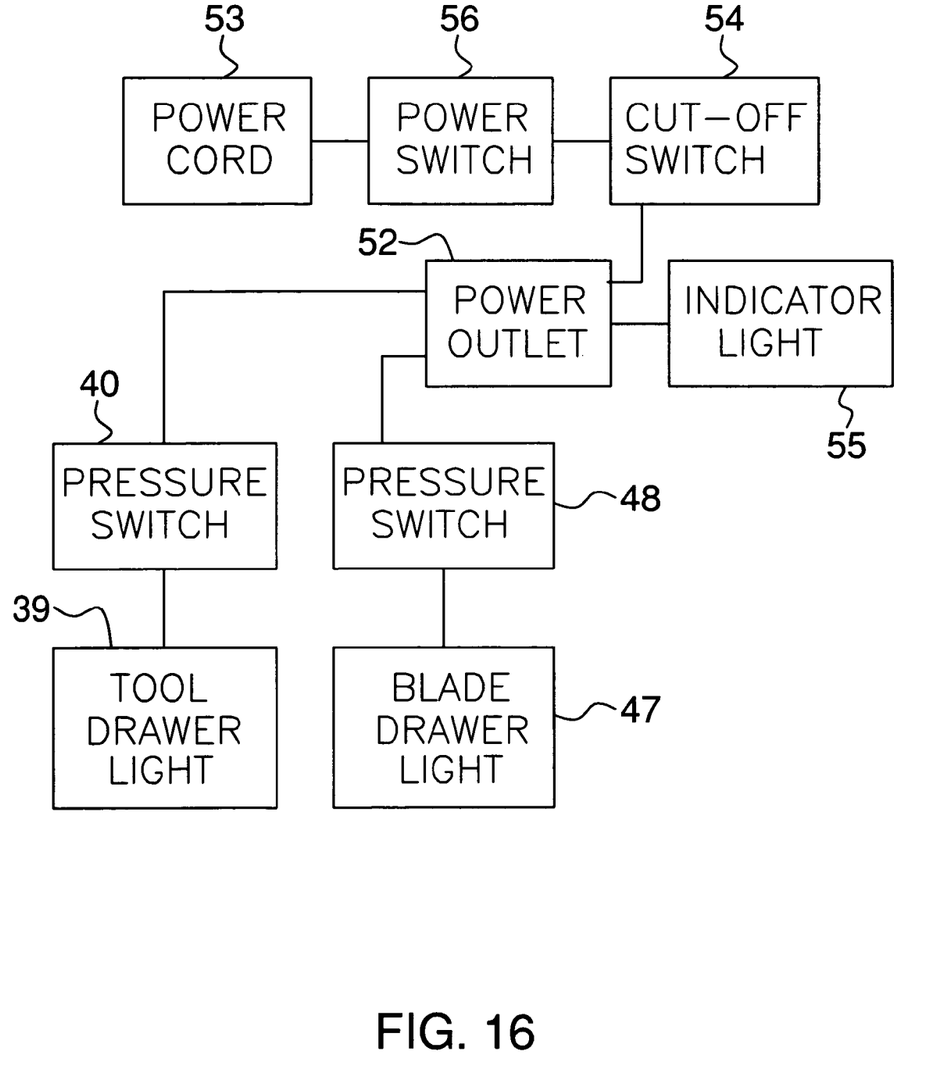
FIG. 16 is an electronic schematic view of the present invention.

FIG. 15 shows a side view of an attachment which may be removably positioned on the table 12. The attachment includes a secondary table 70 securable to a track 71 attached to the back of the table 12. Legs 72 extend down from the secondary table 70 to support it above the tabletop 13. Toggle clamps 73 are attached to the secondary table 70 and are configured to securely hold an item being worked on.

In use, the apparatus 10 is used as a cutting table for a variety of power cutting tools. This eliminates the need for a table saw, a router table and a vertically supported jigsaw. Additionally, the apparatus 10 can be used for storing a variety of tools.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A worktable assembly comprising:

a table including a tabletop having a top side, a bottom side, a front edge, a back edge, a first side edge and a second side edge, a plurality of legs being attached to said bottom side and extending downwardly therefrom, said tabletop having an opening extending therethrough, said opening generally extending between said front and back edges and being positioned between said first and second side edges;

a panel being hingedly coupled to said tabletop adjacent to said opening, said panel being selectively positioned in a closed position extending over said opening or in an open position exposing said opening, said panel having an upper surface and a lower surface, said panel having central aperture extending therethrough;

a plurality of brackets being attached to the lower surface of said panel, said brackets being configured to releasably couple a cutting tool to said lower surface such that a cutting implement of said cutting tool extends through said central aperture, and a blade drawer being attached to said bottom side of said tabletop, said blade drawer including an upper wall having a plurality of elongated slots extending therethrough, said slots being configured for receiving circular saw blades.

2. The assembly according to claim 1, wherein said central aperture is circular in shape and has a diameter of between ½ inch and 2 inches.

3. The assembly according to claim 2, wherein said panel having an elongated aperture therein, said elongated aperture has a length greater than 5 inches, said cutting implement being selectively extendable through said elongated aperture.

4. The assembly according to claim 3, wherein said elongated aperture is orientated parallel to said back edge of said tabletop, said elongated aperture being positioned between said central aperture and said back edge of said tabletop when said panel is in said closed position.

5. The assembly according to claim 4, wherein said panel has an oblong aperture therein, said oblong aperture being positioned between said central aperture and said front edge when said panel is in said closed position.

6. The assembly according to claim 5, further including a biasing assembly being attached to said table and biasing said panel upwardly when said panel is placed in said open position.

7. The assembly according to claim 1, further including a plurality of guide tracks being positioned in said upper surface of said panel, a plurality of cutting guides, each of said cutting guides being selectively mounted in and movable along one of said guide tracks.

8. The assembly according to claim 1, further including a tool drawer being attached to said bottom side of said tabletop, a plate being removably mounted in said tool drawer between an upper edge of said tool drawer and a bottom wall of said tool drawer, said plate having a plurality of holes extending therethrough.

9. The assembly according to claim 1, further including a housing being mounted to said table and spaced from said tabletop, said housing having a cover attached thereto for selectively opening or closing said housing.

10. The assembly according to claim 1, further including a power outlet being mounted on said table, an electrical power cord being electrically coupled to said power outlet.

11. The assembly according to claim 10, further including a cut-off switch being electrically coupled to said power outlet and being configured to selectively close an electrical connection between said power outlet and said power cord, said cut-off switch being positioned on a front side of said table.

12. The assembly according to claim 1, further including a biasing assembly being attached to said table and biasing said panel upwardly when said panel is placed in said open position.

13. A worktable assembly comprising:
   a table including a tabletop having a top side, a bottom side, a front edge, a back edge, a first side edge and a second side edge, a plurality of legs being attached to said bottom side and extending downwardly therefrom, said tabletop having an opening extending therethrough, said opening generally extending between said front and back edges and being positioned between said first and second side edges;
   a panel being hingedly coupled to said tabletop adjacent to said opening, said panel being selectively positioned in a closed position extending over said opening or in an open position exposing said opening, said panel having an upper surface and a lower surface, said panel having central aperture extending therethrough, said central aperture being circular in shape and having a diameter of between ½ inch and 2 inches, said panel having an elongated aperture therein, said elongated aperture having a length greater than 5 inches, said elongated aperture being orientated parallel to said back edge of said tabletop, said elongated aperture being positioned between said central aperture and said back edge of said tabletop when said panel is in said closed position, said panel having an oblong aperture therein, said oblong aperture being positioned between said central aperture and said front edge when said panel is in said closed position;
   a plurality of brackets being attached to the lower surface of said panel, said brackets being configured to releasably couple a cutting tool to said lower surface such that a cutting implement of said cutting tool extends through one of said central aperture, elongated aperture or said oblong aperture;
   a plurality of guide tracks being positioned in said upper surface of said panel;
   a plurality of cutting guides, each of said cutting guides being selectively mounted in and movable along one of said guide tracks;
   a tool drawer being attached to said bottom side of said tabletop, a plate being removably mounted in said tool drawer between an upper edge of said tool drawer and a bottom wall of said tool drawer, said plate having a plurality of holes extending therethrough;
   a blade drawer being attached to said bottom side of said tabletop, said blade drawer including an upper wall having a plurality of elongated slots extending therethrough, said slots being configured for receiving circular saw blades;
   a housing being mounted to said table and spaced from said tabletop, said housing having a cover attached thereto for selectively opening or closing said housing;
   a power outlet being mounted on said table, an electrical power cord being electrically coupled to said power outlet, a cut-off switch being electrically coupled to said power outlet and being configured to selectively close an electrical connection between said power outlet and said power cord, said cut-off switch being positioned on a front side of said table; and
   a biasing assembly being attached to said table and biasing said panel upwardly when said panel is placed in said open position.

* * * * *